United States Patent
Rabinowitz et al.

(10) Patent No.: US 7,597,826 B1
(45) Date of Patent: Oct. 6, 2009

(54) MANUFACTURE OF TRANSPARENT MIRRORED MICRO-BALLS FOR SOLAR ENERGY CONCENTRATION AND OPTICAL FUNCTIONS

(75) Inventors: Mario Rabinowitz, 715 Lakemead Way, Redwood City, CA (US) 94062; John Eugene Kuczaj, Clinton Township, MI (US)

(73) Assignee: Mario Rabinowitz, Redwood City, CA (US)

( * ) Notice: Subject to any disclaimer, the term of this patent is extended or adjusted under 35 U.S.C. 154(b) by 880 days.

(21) Appl. No.: 11/104,317

(22) Filed: Apr. 12, 2005

(51) Int. Cl.
*B29D 11/00* (2006.01)
*B29B 11/02* (2006.01)

(52) U.S. Cl. .................. 264/1.6; 264/1.8; 264/2.6; 264/2.7; 264/166; 264/341; 264/346

(58) Field of Classification Search ............ 264/1.1, 264/1.6–1.8, 2.6, 2.7, 166, 341, 346, 1.9, 264/167, 16; 156/268, 269; 427/162, 163.4
See application file for complete search history.

(56) References Cited

U.S. PATENT DOCUMENTS

| | | | |
|---|---|---|---|
| 3,670,323 A | 6/1972 | Sobel et al. | |
| 4,298,448 A | 11/1981 | Muller et al. | |
| 4,469,645 A * | 9/1984 | Eigenmann | 264/1.6 |
| 4,810,431 A * | 3/1989 | Leidner | 264/15 |
| 5,754,332 A | 5/1998 | Crowley | |
| 5,808,783 A | 9/1998 | Crowley | |
| 5,815,306 A | 9/1998 | Sheridan et al. | |
| 5,914,805 A | 6/1999 | Crowley | |
| 5,930,026 A | 7/1999 | Comiskey | |
| 5,982,346 A | 11/1999 | Sheridon | |
| 6,120,588 A | 9/2000 | Jacobson | |
| 6,197,228 B1 | 3/2001 | Sheridon | |
| 6,211,998 B1 | 4/2001 | Sheridon | |
| 6,222,513 B1 | 4/2001 | Howard et al. | |
| 6,243,058 B1 | 6/2001 | Mikkelsen et al. | |
| 6,262,707 B1 | 7/2001 | Sheridon | |
| 6,294,401 B1 | 9/2001 | Jacobson et al. | |
| 6,323,989 B1 | 11/2001 | Jacobson et al. | |
| 6,335,818 B1 | 1/2002 | Torres | |
| 6,570,700 B2 | 5/2003 | Engler et al. | |
| 6,612,705 B1 | 9/2003 | Davidson et al. | |
| 6,664,027 B2 | 12/2003 | Griffith et al. | |
| 6,680,725 B1 | 1/2004 | Jacobson | |
| 6,698,693 B2 | 3/2004 | Davidson et al. | |

(Continued)

FOREIGN PATENT DOCUMENTS

WO PCT/US02/20199 6/2002

*Primary Examiner*—Mathieu D. Vargot (57) ABSTRACT

Method and apparatus are presented for mass production manufacturing of micro-mirrored balls for solar energy and related applications such as optical switches, etc. For these applications it is imperative to provide accurate specular reflection from the mirror. The mass production process utilizes laminate sheets containing reflective material, assembly rollers, and extrusion and die rollers. The micro-mirrored balls are in the size range of 4 microns ($4 \times 10^{-6}$ m) to 1 mm ($10^{-3}$ m), and in one form are transparent in at least one hemisphere with a reflecting mid-plane mirror. In other forms the micro-balls vary in geometry from cylinders to oblate ellipsoids to disks. The term "elements" is used to encompass all these shapes, which have one thing in common—a flat specularly reflecting mirrored surface. These elements can track the light source, and aim and focus the reflected light.

19 Claims, 3 Drawing Sheets

U.S. PATENT DOCUMENTS

| | | |
|---|---|---|
| 6,738,176 B2 | 5/2004 | Rabinowitz et al. |
| 6,843,573 B2 | 1/2005 | Rabinowitz et al. |
| 6,957,894 B2 | 10/2005 | Rabinowitz et al. |
| 6,964,486 B2 | 11/2005 | Rabinowitz |
| 6,975,445 B1 | 12/2005 | Rabinowitz |
| 6,987,604 B2 | 1/2006 | Rabinowitz et al. |
| 6,988,809 B2 | 1/2006 | Rabinowitz |
| 7,077,361 B1 | 7/2006 | Rabinowitz |
| 7,112,253 B2 | 9/2006 | Rabinowitz |
| 7,115,881 B2 | 10/2006 | Rabinowitz |
| 7,130,102 B2 | 10/2006 | Rabinowitz |
| 7,130,107 B2 | 10/2006 | Liu et al. |
| 7,133,183 B2 | 11/2006 | Rabinowitz |
| 2002/0131151 A1 | 9/2002 | Engler et al. |
| 2005/0034750 A1 | 2/2005 | Rabinowitz |
| 2006/0150968 A1 | 7/2006 | Rabinowitz |

\* cited by examiner

MANUFACTURE OF TRANSPARENT MIRRORED MICRO-BALLS FOR SOLAR ENERGY CONCENTRATION AND OPTICAL FUNCTIONS

BACKGROUND OF THE INVENTION

Field of the Invention

The instant invention relates to method and apparatus for the mass production of transparent mirrored micro-balls for solar energy concentration and other optical functions. The mass production process utilizes laminates, assembly rollers, and extrusion and die rollers. The micro-balls are in the size range of 4 microns ($4 \times 10^{-6}$ m) to 1000 microns (1 mm). In one form the micro-balls are transparent in both hemispheres, and have a mid-plane mirror. In another form the micro-balls are transparent in one hemisphere with the other hemisphere being opaque or translucent, and have a mid-plane mirror. In other embodiments the micro-balls vary in geometry from cylinders to oblate ellipsoids to disks. The term "elements" is used to encompass all these shapes, which have one thing in common—a flat specularly reflecting mirrored surface. These elements can track the light source, and aim and focus the reflected light as taught in the incorporated references below.

INCORPORATION BY REFERENCE

In a solar energy application, these elements in the form of transparent reflecting micro-balls and other shapes are a critical feature of a unique solar concentrator which directs sunlight to a receiver (as well as other functions) as described in the following patents and copending patent applications related to this case. The following U.S. patents, allowed patent applications, pending patent applications, and Solar Journal publication are fully incorporated herein by reference:

1. U.S. Pat. No. 6,843,573 by Mario Rabinowitz and Mark Davidson "Mini-Optics Solar Energy Concentrator" issued on Jan. 18, 2005.
2. U.S. Pat. No. 6,738,176 by Mario Rabinowitz and Mark Davidson, "Dynamic Multi-Wavelength Switching Ensemble" issued on May 18, 2004.
3. U.S. Pat. No. 6,698,693 by Mark Davidson and Mario Rabinowitz, "Solar Propulsion Assist" issued on Mar. 2, 2004.
4. U.S. Pat. No. 6,612,705 by Mark Davidson and Mario Rabinowitz, "Mini-Optics Solar Energy Concentrator" issued on Sep. 2, 2003.
5. U.S. Publication #2003-0193726-A1 by Mark Davidson and Mario Rabinowitz, "Active Reflection, Illumination, and Projection" published on Oct. 16, 2003.
6. U.S. Publication #2005-0087294, by Mario Rabinowitz, "Manufacturing Transparent Mirrored Mini-Balls for Solar Energy Concentration and Analogous Applications" is now U.S. Pat. No. 7,112,253.
7. U.S. Publication #2005-0157411, by Mario Rabinowitz, "Advanced Micro-Optics Solar Energy Collection System" now U.S. Pat. No. 6,988,809.
8. U.S. Publication #2005-0162763, by Mario Rabinowitz, "Alignment of Solar Concentrator Micro-Mirrors" now U.S. Pat. No. 6,964,486.
9. Solar Energy Journal, Vol. 77, Issue #1, 3-13 (2004) "Electronic film with embedded micro-mirrors for solar energy concentrator systems" by Mario Rabinowitz and Mark Davidson. Also in http://xxx.arXiv.org/abs/physics/0404080.

DESCRIPTION OF THE PRIOR ART

The manufacturing processes as taught herein are distinct and different from the prior art in at least two ways. First, none of the prior art is concerned with the manufacture of mirrors in transparent micro-balls, or as part of the various elements described in the instant invention. Second the prior art of others does not utilize reflecting micro-mirrors in the applications of the instant invention such as a Solar Concentrator, Optical Switching, Solar Propulsion Assist, and Active Reflection, Illumination, And Projection.

The U.S. Patent Application #2003/0117424 A1 of Kinoshita, Hayashi, and Ozaki, entitled COLORED ROTATION SPHERICAL MATERIAL, MANUFACTURING METHOD THEREFOR, AND DISPLAY DEVICE is concerned with enhancing the degree of whiteness of a ball in a display device. They have no transparent hemisphere and there is no specular mirror, both of which are key aspects of the instant invention. As stated in their Abstract: "A colored rotation spherical material is configured so as to have two parts different from each other in color, such as a white part and a black part, and an optically reflective region between the two parts, such as a reflective layer. With this constitution, since the reflective layer reflects light which is usually absorbed in the black part, and the white part scatters the reflected light again, whiteness degree and reflectance increase." Their objective is just to enhance the white color in a display device. That is clearly why they are not trying to manufacture a mirror.

DEFINITIONS

"Binder" refers herein to a plastic additive that is used to promote solidification, provide mechanical strength, and to ensure uniform consistency.

"Collector" or "Receiver" as used herein denotes any device for the conversion of solar energy into other forms such as electricity, heat, pressure, concentrated light, etc.

"Concentrator" as used herein in general is a micro-mirror system for focussing and reflecting light. In a solar energy context, it is that part of a solar Collector system that directs and concentrates solar radiation onto a solar receiver or other device. As used herein, concentrator refers to an ensemble of focussing planar mirrors which acts as a thin almost planar mirror constructed with stepped varying angles so as to have the optical properties of a much thicker concave mirror. Heuristically, it can somewhat be thought of as the projection of thin variable-angular segments of small portions of a thick mirror upon a planar surface. It is a focusing planar reflecting surface much like a planar Fresnel lens is a focusing transmitting surface. The tracking-focussing property of an ensemble of tiny elements like balls which make up the focussing planar mirror is an essential manufacturing goal of the instant invention.

"Dielectric" refers to an insulating material in which an electric field can be sustained with a minimum power dissipation. As used herein, "dielectric" will be a convenient way of referring to either plastic or glass.

"Elastomer" is a material such as synthetic rubber or plastic, which at ordinary temperatures can be stretched substantially under low stress, and upon immediate release of the stress, will return with force to approximately its original length. Silicone elastomers have exceptional ability to withstand ultraviolet light degradation.

"Element" is a rotatable mirrored component of a concentrator, such as a ball, cylinder, disk, semi-sphere, etc.

"Focussing planar mirror" is a thin almost planar mirror constructed with stepped varying angles so as to have the optical properties of a much thicker concave (or convex) mirror. It can heuristically be thought of somewhat as the projection of thin equi-angular segments of small portions of a thick mirror upon a planar surface. It is a focusing planar reflecting surface much like a planar Fresnel lens is a focusing transmitting surface. If a shiny metal coating is placed on a Fresnel lens it can act as a Fresnel reflector.

"Lexan" is General Electric's trade name for a group of polyesters formed from carbonic acid, and generally called polycarbonate (PC). Polycarbonate has excellent mechanical properties while at the same time it has an ease for molding and extrusion. Lexan has good dimensional stability, good resistance to creep, and a high distortion temperature.

"Lucite" is DuPont's trade name for its transparent acrylic plastic and resins with no definite melting point.

"Mirror" as used herein refers to a highly reflective smooth surface (smooth on a size scale small compared to the wavelength of incident light). The smoothness achieves specular reflection.

"Plastic" is a polymeric material (usually organic) which can be shaped by flow. The resin is the homogeneous starting material, whereas the "plastic" refers to the final product also containing fillers, plasticizers, stabilizers, etc.

"Plasticizer" is added to a material to make it softer, more flexible, or more moldable. It is also called a flexibilizer because it is an additive that gives an otherwise rigid plastic flexibility.

"Plastic paint" is a paint composed of a plastic in a solvent such that when the solvent is removed as by vaporization, a thin coating of the plastic remains on the coated surface.

"Plexiglass" is a transparent plastic made from methyl methacrylate, similar to Lucite. Both can readily be made in sheet form.

"Silicone" as used herein refers to a heat-stable, rubber-like elastomer that is a water repellent, semiorganic polymer of organic radicals attached to silicon containing molecules, such as dimethyl silicone. Silicone elastomers are an excellent material within which to embed the mirrored balls or cylinders, because of their durability with respect to ultraviolet light, among other reasons.

"Specular reflection" occurs when the angle of reflection is equal to the angle of incidence of a light ray relative to a line perpendicular to the macroscopic reflecting surface, and lie in the same plane with it. Thus the reflected light ray travels in a definite predictable direction.

"Thermoplastic" refers to materials with a molecular structure that will soften when heated and harden when cooled. This includes materials such as vinyls, nylons, elastomers, fuorocarbons, polyethylenes, styrene, acrylics, cellulosics, etc.

SUMMARY OF THE INVENTION

There is one object, and there are many aspects of this invention for the method and apparatus of manufacture of mirrored balls to be used in solar concentrators and analogous applications. All the aspects apply to the same objective of being technically sound, economically viable, practical, and efficient in the construction of specular mirrors in spheroidal micro-balls.

One aspect of the invention is the bonding of thin plastic sheet on both sides of a thin metal foil, and then extruding mid-plane mirrored balls from a two meshing wheels roller die.

Another aspect of the invention teaches the bonding of thin glass sheet on both sides of a thin metal foil, and then extruding mirrored balls from a two meshing wheels roller die.

In another aspect of the invention, a thin plastic sheet is metalized on one side, then a second plastic sheet is bonded to the thin metal layer, and then mirrored balls are extruded from a two meshing wheels roller die.

In another aspect of the invention, a thin glass sheet is metalized on one side, then a second glass sheet is bonded to the thin metal layer, and then mirrored balls are extruded from a two meshing wheels roller die.

In another aspect of this invention, liquid plastic droplets are placed in the concave hemispherical molds of two meshing roller wheels, metalized as by metallic vapor deposition, on at least one of the flat surfaces, and then meshed together in a bonding operating.

In another aspect of the invention, cylinders are mirrored in their midplanes by the same production methods listed above for balls. So herein the term ball will refer to both spheroids and cylinders.

Other objects and advantages of the invention will be apparent in a description of specific embodiments thereof, given by way of example only, to enable one skilled in the art to readily practice the invention singly or in combination as described hereinafter with reference to the accompanying drawings. In the detailed drawings, like reference numerals indicate like components.

DETAILED DESCRIPTION OF THE PRESENTLY PREFERRED EMBODIMENTS

As is described in detail, the manufacturing objectives of the instant invention may be accomplished by any of a number of ways separately or in combination, as taught herein.

Figure 1:
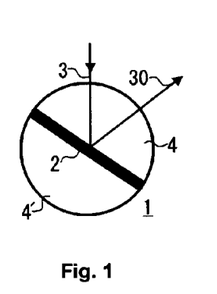
FIG. 1 is a cross-sectional view of a single spheroidal ball with a midplane mirror. This ball is one of a multitude of optical elements which can track a light source and focus a concentrated light beam onto a receiver.

FIG. 1 shows a rotatable element 1 of a focussing planar micro-mirror 2 with a mid-plane flat reflecting surface which specularly reflects incident light ray 3 so that the reflected light ray 30 is in the same plane and the angle of refection equals the angle of incidence. The element 1 shown here is a cross-sectional view of a single spheroidal ball of top transparent dielectric semi-sphere 4, and bottom material 4'. The ball element 1 is capable of two-axis tracking of the light source such as the sun, as are most of the different geometrical elements shown in FIGS. 1-11. The top semi-sphere 4 must be transparent, and the bottom semi-sphere 4' is preferably transparent, but may be opaque and may even be metallic. This element 1 is one of a multitude of optical elements which can track a light source and focus a concentrated light beam onto a receiver as described in detail in references 1-9 above, especially reference 8.

Figure 2:
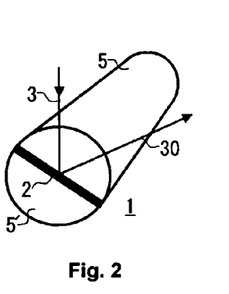
FIG. 2 is a cross-sectional view of a cylinder with an internal flat reflecting mirror. This cylinder is one of a multitude of optical elements which can track a light source and focus a concentrated light beam onto a receiver.

FIG. 2 shows a rotatable element 1 of a focussing planar micro-mirror 2 with an internal flat reflecting surface inside the element 1. The mirror 2 is in the plane between top hemicylinder 5 and bottom hemicylinder 5', and specularly reflects the incident light ray 3 with the reflected light ray 30. The element 1 shown is a perspective view of a cylinder which is capable of single-axis tracking of the light source such as the sun. The top semi-cylinder 5 must be transparent, and the bottom semi-cylinder is preferably transparent, but may be opaque and may even be metallic. This element 1 is one of a multitude of optical elements which can track a light source and focus a concentrated light beam onto a receiver.

Figure 3:
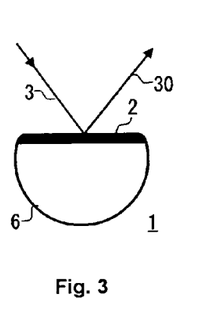
FIG. 3 is a cross-sectional view of a single semi-sphere with a mirror on its flat top. This mirrored semi-sphere is one of a multitude of optical elements which can track a light source and focus a concentrated light beam onto a receiver.

FIG. 3 is a cross-sectional view of a single rotatable element 1 which is a semi-sphere 6 with a flat top. Herein it is called a flat-top ball 6 with a mirror 2 which receives incident light 3 and returns reflected light 30. The flat on the top of the ball can be produced by any of standard techniques such as machining, shearing, die extrusion, etc. as will be subsequently discussed in conjunction with FIG. 12 and following. The technique or combination of techniques used, will depend on the degree of optical flatness required. The flat tops could be machined prior to metal deposition if a high degree of optical flatness is necessary. The semi-sphere 6 is preferably transparent, but may be opaque, and may even be metallic. This element 1 is one of a multitude of optical elements which can track a light source and focus a concentrated light beam onto a receiver.

Figure 4:
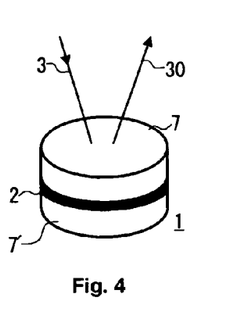
FIG. 4 is a perspective view of a circular disk with an internal flat reflecting mirror. This disk is one of a multitude of optical elements which can track a light source and focus a concentrated light beam onto a receiver.

FIG. 4 shows a perspective view of a rotatable element 1 of a focussing planar micro-mirror 2 with an internal flat reflecting surface inside the element 1. The element 1 is formed of two circular dielectric disks 7, between which is sandwiched mirror 2 that specularly reflects the incident light ray 3 with the reflected light ray 30. The element 1 has a mirror 2 sandwiched between the dielectric disks 7. The top disk must be transparent, and the bottom disk is preferably transparent, but may be opaque, and may even be metallic. This element 1 is one of a multitude of optical elements which can track a light source and focus a concentrated light beam onto a receiver.

and the bottom semi-cylinder is preferably transparent, but may be opaque and may even be metallic. This element 1

Figure 5:
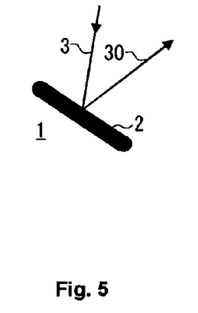
FIG. 5 is a is a cross-sectional view of a circular metal disk highly reflecting mirror. This metal disk is one of a multitude of optical elements which can track a light source and focus a concentrated light beam onto a receiver.

FIG. 5 shows a cross-sectional view of a rotatable element 1 which is a circular disk with rounded edges that serves as a metallic micro-mirror 2, which specularly reflects the incident light ray 3 with the reflected light ray 30. The element 1 is one of a multitude of optical elements which can track a light source and focus a concentrated light beam onto a receiver.

Figure 6:
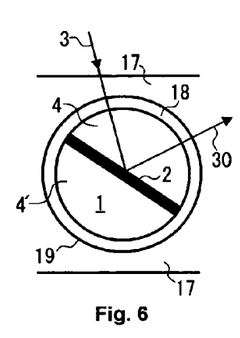
FIG. 6 is a cross-sectional view of a single spheroidal element (ball or cylinder) with a midplane mirror. This element is encapsulated in a lubricated spheroidal cavity, and is one of a multitude of optical elements which can track a light source and focus a concentrated light beam onto a receiver.

FIG. 6 is a cross-sectional view showing the element 1 of FIG. 1. This cross-section depicts either a rotatable ball or a rotatable cylinder, completely encompassed with a lubricating fluid 18 which is encapsulated inside a concentric cavity 19 of sheet 17. Thus the confined and lubricated element 1 can make a nearly frictionless rotation, with hardly any undesirable displacement. The focussing planar micro-mirror 2 is a mid-plane flat reflecting surface which specularly reflects incident light ray 3 with the reflected light ray 30. An ensemble of such elements can thus be aligned with the application of moderate power. It is preferable to utilize a liquid 18 whose index of refraction matches the clear hemisphere or clear hemicylinder, and it should have the same density as element 1 to minimize buoyant forces. The index of refraction of the sheet 17, the liquid 18, and the optically transmissive upper portion of elements 1 should all be approximately equal. The elements 1 should be roughly balanced to minimize gross gravitational orientation.

Figure 7:
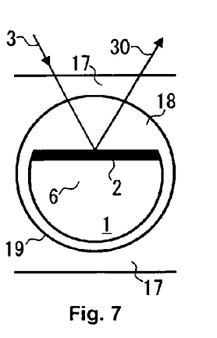
FIG. 7 is a cross-sectional view of a single semi-sphere with a mirror on its flat top. This element is encapsulated in a lubricated spheroidal cavity, and is one of a multitude of optical elements which can track a light source and focus a concentrated light beam onto a receiver.

FIG. 7 is a cross-sectional view of a single rotatable element 1 which is a semi-sphere 6 with a flat top micro-mirror 2 with rounded edges. The element 1 is completely encompassed with a lubricating fluid 18 which is encapsulated inside a concentric cavity 19 of sheet 17. Also shown is the incident light ray 3 and the reflected light ray 30.

Figure 8:
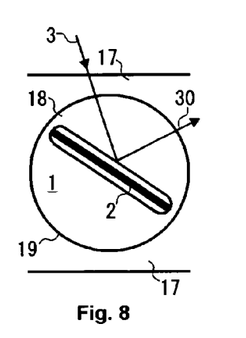
FIG. 8 is a cross-sectional view of a circular disk with an internal flat reflecting mirror. This element is encapsulated in a lubricated spheroidal cavity, and is one of a multitude of optical elements which can track a light source and focus a concentrated light beam onto a receiver.

FIG. 8 is a cross-sectional view of a rotatable element 1 of a focussing planar micro-mirror 2 between circular transparent dielectric top disk 7, and bottom disk 7' with rounded edges. The element 1 is completely encompassed with a lubricating fluid 18 which is encapsulated inside a concentric cavity 19 of sheet 17. Also shown is the incident light ray 3 and the reflected light ray 30.

Figure 9:
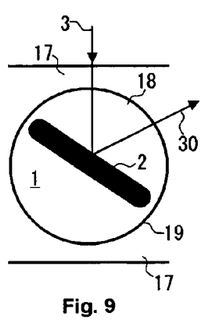
FIG. 9 is a cross-sectional view of a circular metal disk highly reflecting mirror. This element is encapsulated in a lubricated spheroidal cavity, and is one of a multitude of optical elements which can track a light source and focus a concentrated light beam onto a receiver.

FIG. 9 shows a cross-sectional view of a rotatable element 1 which is a circular disk metallic micro-mirror 2 with rounded edges, that is completely encompassed with a lubricating fluid 18 which is encapsulated inside a concentric cavity 19 of sheet 17. Also shown is the incident light ray 3 and the reflected light ray 30.

Figure 10:
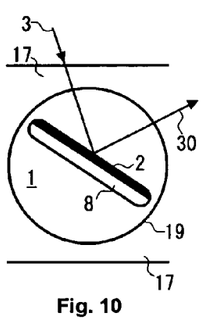
FIG. 10 is a cross-sectional view of a circular disk with a top surface flat reflecting mirror. This element is encapsulated in a lubricated spheroidal cavity, and is one of a multitude of optical elements which can track a light source and focus a concentrated light beam onto a receiver.

FIG. 10 shows a cross-sectional view of a rotatable element 1 which is a flat circular disk micro-mirror 2 on the top surface with backing 8, that is completely encompassed with a lubricating fluid 18 which is encapsulated inside a concentric cavity 19 of sheet 17. The backing 8 is present to give the micro-mirror 2 rigidity if the mirror is made of a highly reflective thin film of Chromium or Aluminum. The backing 8 may be metallic or dielectric. Also shown is the incident light ray 3 and the reflected light ray 30.

Figure 11:
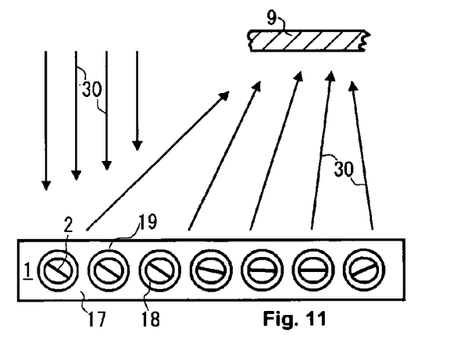
FIG. 11 is a cross-sectional view of an ensemble of micromirrors encapsulated in lubricated cavities in a micro-optics concentrator. These micro-mirrors are rotatable so they can focus incident sunlight onto a receiver.

FIG. 11 is a cross-sectional view of concentrator comprising an ensemble of elements 1 containing micro-mirrors 2 encapsulated in lubricant 18 inside spherical cavities 19 in a micro-optics concentrator. These micro-mirrors 2 are thus rotatable with minimal friction, so they can focus incident light 3 with concentrated reflected light 30 onto a receiver 9.

For example for a concentrator of elements 1 which are balls as shown, with a spherical cavity 19 diameter of 100 microns ($10^{-4}$ m=0.1 mm) a million balls would cover an area ~100 $cm^2$. A typical concentrator would have an enormous number of billions of balls, which track and focus a source of light such as the sun either singly or in groups of millions.

Figure 12:
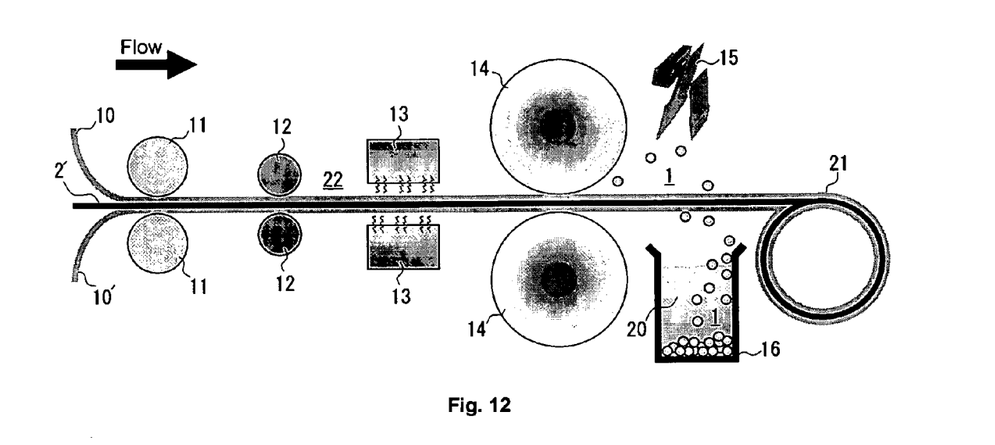
FIG. 12 is a schematic of one embodiment for the mass-production of micro-mirror elements, utilizing a 3-layer laminate.

FIG. 12 is a schematic of one embodiment for the mass-production of micro-mirror elements 1, utilizing a 3-layer laminate sheet 22. In this embodiment, the reflective material is a metallic foil 2' (which will become the micro-mirrors 2) is bonded between top dielectrics 10 and bottom material 10'. Bonding can be achieved by heat or pressure sensitive adhesive (cement, glue, etc.). Some materials permit simple heat bonding, and this is preferred to cement or glue from an expense point of view as well as a thickness point of view. Bonding is implemented by the bonding rollers 11. The top dielectric 10 must be transparent, and may be plastic or glass. A plasticizer may be added to the plastic to make it softer, more flexible, and hence more moldable. The advantages and disadvantages of plastic and glass for the top dielectric 10 will be discussed in the section on DISCUSSION OF PRESENTLY PREFERRED EMBODIMENTS. The bottom material 10' need not be transparent, and need not even be a dielectric. The bottom material 10' may be a different metal from that of the metallic foil 2', or may even be the same metal when there is a bonding of only two materials. Thus an element 1 may be a ball with only two materials—top hemisphere of dielectric 10 and bottom hemisphere of bottom metal 10', whose flat surface is the micro-mirror 2. In fact if a metallic disk is manufactured, such as described in conjunction with FIG. 5, there is only one material. See the section on DISCUSSION OF PRESENTLY PREFERRED EMBODIMENTS for the advantages and disadvantages of these options. The 3-material manufacturing scheme is described as the most general, of which the others are variations. This includes the manufacturing scheme of FIG. 15 in which the material 2' (to become the micro-mirrors 2) is vapor deposited on the bottom of material 10.

After the materials 2', 10, and 10' are bonded, the 3-layer laminate sheet 22 moves through the smoothing rollers 12 which also act as drive rollers. The smoothing rollers 12 help to achieve an optically flat surface for material 2' which will become the micro-mirrors 2 of elements 1. Next the sheet 22 passes through a heating oven 13 which warms up the laminate sheet 22 to the softening point of the materials 10 and 10'. The heated sheet 22 then goes through the synchronized extrusion die rollers 14. As the elements 1 with micro-mirrors 2 are punched out of the laminate sheet 22, air jets 15 direct the elements 1 into the container 16 with a liquid 20 to protect them, slow them down, and prevent scuffing. The now holey sheet is finally wound up on the winding roller 21. The liquid 20 may be heated and also contain a small amount of solvent/plasticizer for material 10 so that surface tension can abate any imperfections of the surface of material 10 to maintain its optical integrity of transparency and smoothness. Immersing the elements 1 in an inert liquid 20 heat bath such as silicone oil is an exceptional method. The liquid heat bath 20 provides sufficient buoyant force to the elements 1 that in the ball embodiment, a smooth spherical surface may be obtained, as produced by surface tension of the transparent dielectric material at elevated temperature. Heating the liquid bath 20 anneals out surface and bulk imperfections.

Figure 14:
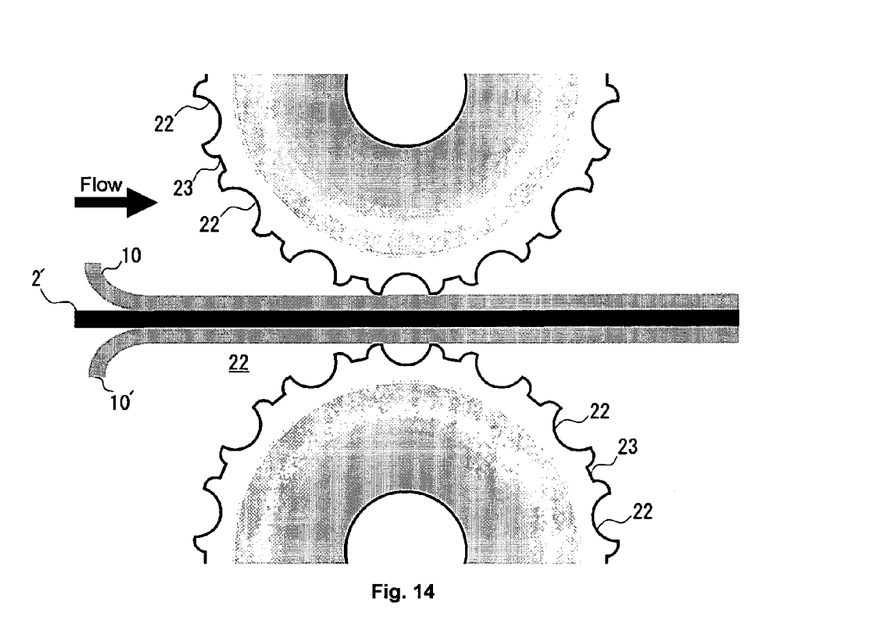
FIG. 14 is a close-up cross-sectional view of the laminate going through the two roller extrusion die from which the micro-mirrored balls are punched out.

In addition to the application of tension provided by the pairs of rollers 11, 12, and 14 it is important to observe critical geometrical constraints provided by the dies 22 as described in conjunction with FIG. 14 for the heat treatment to result in a smooth specularly reflecting micro-mirror 2 between two hemispheres. Such considerations have not been taught by the prior art such as Kinoshita et al as previously discussed, because a specularly reflecting mirror surface is not important for their objective of increasing the whiteness of one their hemispheres.

Figure 13:
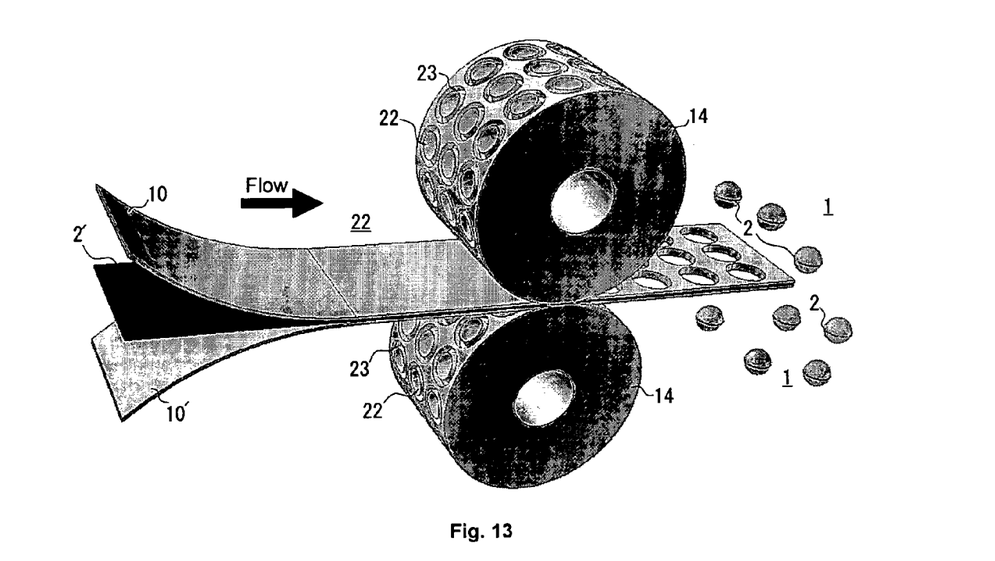
FIG. 13 is a perspective view of the laminate going through the two roller extrusion die from which the micro-mirrored balls are punched out.

FIG. 13 is a perspective illustrative view of the 3-layer laminate sheet 22 going through the two roller extrusion die wheels 14 from which the micro-mirrored elements 1 are punched out. The illustration does not show the detailed characteristics of the surface of the die wheel, as these are shown in FIG. 14. The elements 1 shown here are balls. The laminate sheet is formed from materials 10 and 10'. The top dielectric material 10 must be transparent, and may be plastic or glass. The advantages and disadvantages of plastic and glass for the top dielectric 10 will be discussed in the section on DISCUSSION OF PRESENTLY PREFERRED EMBODIMENTS. The bottom material 10' need not be transparent, and need not even be a dielectric. The bottom material 10' may be a different metal from that of the reflective material metallic foil 2', or may even be the same metal when there is a bonding of only two materials. The elements 1 with micro-mirrors 2 are shown falling out of the punched laminate sheet. Plastic binder may be added to the elements 1 after they are extruded to promote solidification, provide mechanical strength, and to ensure uniform consistency. Differences in coefficients of expansion of the materials 10, 10', and 2 are not critical in the completed elements 1 since the dimensions are small.

FIG. 14 is a close-up cross-sectional view of the laminate sheet 22 going through the two roller extrusion die from which the micro-mirrored elements 1 are punched out. The two roller extrusion die wheels 14 are shown separated for clarity. In operation the wheels 14 meet each other in cutting through and extruding the laminate sheet 22 into the dies 22 with excess material squeezed out into the pockets 23. A plasticizer/lubricant may be injected into the dies 22 to facilitate the formation of a smooth surface of the elements 1. Registration (alignment) of the semispherical dies 22 is achieved by careful registration of the two wheels 14. For some laminate materials, the dies 22 may be made of ceramic or platinum-like metals as discussed in the section on DISCUSSION OF PRESENTLY PREFERRED EMBODIMENTS. In this embodiment, the laminate sheet 22 is made of the outer dielectric materials 10, 10', and the reflective material 2 as described above. Thermoplastic dielectrics for 10 and 10' are relatively easy to extrude because their molecular structure that will soften when heated and harden when cooled. This includes materials such as vinyls, nylons, elastomers, fuorocarbons, polyethylenes, styrene, acrylics, cellulosics, etc.

Figure 15:
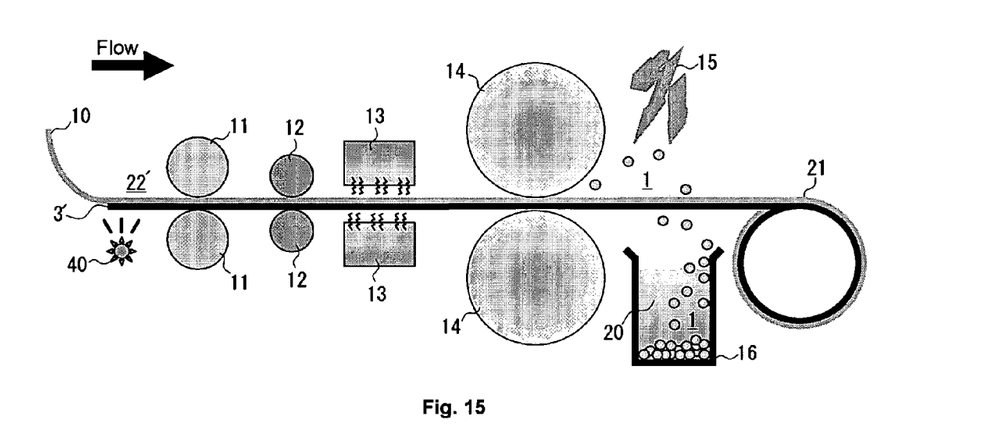
FIG. 15 is a schematic of another embodiment for the mass-production of micro-mirror elements, utilizing a 2-layer laminate.

FIG. 15 is a schematic of another embodiment for the mass-production of micro-mirror elements 1, utilizing a 2-layer laminate sheet 22'. In this embodiment, a metallic foil (which will become the micro-mirrors 2) can be bonded to the dielectric 10 forming a 2-layer laminate sheet 22'; or as shown a metallic film 3' (which acts as the reflective material) is vapor deposited on to the dielectric material 10 by means of the vaporizer 40. Differences in coefficients of expansion of the materials 10, 10', and 2 are not critical in the completed elements 1 since the dimensions are small. The dielectric material 10 may be an elastomer can be stretched substantially under low stress, and upon immediate release of the stress, will return to approximately its original length. Silicone elastomers would be preferred for solar energy applications because of their exceptional ability to withstand ultraviolet light degradation.

Aluminum is a good choice for the metallic reflecting material 3' because it is inexpensive and highly reflective. Only about 1000 Angstroms of Aluminum is required to achieve a high degree of reflection. For most of the effective wavelengths the reflectivity of Al is over 88%. An alternate to the vapor deposition shown is the brushing on of a low temperature liquid metal (such as discussed in the Section DISCUSSION OF PRESENTLY PREFERRED EMBODIMENTS.

In this embodiment, an element 1 may be a ball, etc. with only two materials—top hemisphere of dielectric 10 and bottom hemisphere of bottom metal 3', whose flat surface is the micro-mirror 2. In fact if a metallic disk is manufactured, such as described in conjunction with FIG. 5, there is only one material. See the section on DISCUSSION OF PRESENTLY PREFERRED EMBODIMENTS for the advantages and disadvantages of these options. The 2-layer laminate sheet 22' moves through the smoothing/drive rollers 12. Next the laminate 22' passes through a heating oven 13 which warms up the sheet 22 to the softening point of the material 10. It is not critical to reach the softening point of the metal 3' as metal is readily sheared and extruded; and this bottom side of the elements 1 does not have to meet the optical requirements of the top material 10 and the flat interface part of the metal 3'. The heated sheet 22' then goes through the synchronized extrusion die rollers 14. As the elements 1 with micro-mirrors 2 pop out of the laminate sheet 22, air jets 15 direct the elements 1 into the container 16 with a liquid 20 to protect them, slow them down, and prevent scuffing. The now holey sheet is finally wound up on the winding roller 21. The liquid 20 may be heated and also contain a small amount of solvent/plasticizer for material 10 so that surface tension can abate any imperfections of the surface of material 10 to maintain its optical integrity of transparency and smoothness. Heating the liquid bath 20 anneals out surface and bulk imperfections.

Discussion of Presently Preferred Embodiments

Many variations of the two wheel extrusion die rollers are possible. One such alternative embodiment is a single wheel moving over a fixed laminate sheet which rests on a fixed mirror-image die of hemispherical cavities and pockets in which waste material is extruded. However, the two wheel extrusion die rollers are the preferred embodiment. Similarly the annealing bath need not be a liquid, but could be a power, etc. However, a liquid bath is the preferred embodiment.

There are many tradeoffs in manufacturing the transparent reflecting micro-mirrored balls, disks, and cylinders of the instant invention for solar energy and analogous applications. One tradeoff is between materials costs versus manufacturing costs. Another tradeoff is between ease of manufacturing the micro-mirrored element 1 versus the enclosing spherical cavity 19. Flat planar disks as described in conjunction with FIGS. 5 and 9 are the simplest and cheapest micro-mirrors to manufacture. However the confining spherical cavities 19 are more difficult to manufacture for disks than for balls. Friction may be expected to be higher for disks in a spherical cavity than for balls. Thus disk rotation may be expected to require larger power dissipation even though the moment of inertia is less for disks requiring less power that goes into kinetic energy. Rotational control of the balls can be achieved by electrostatic, magnetostatic, electromagnetic, electrophoretic, and/or magnetophoretic means as described in the referenced patents and patent applications. The conclusions reached today may well have to be changed in the light of new costs and new developments in the future.

In another embodiment of this invention, liquid plastic or glass droplets are placed in the concave hemispherical molds 22 of the two meshing roller wheels 14 of FIGS. 13 and 14, metalized as by metallic vapor deposition, on at least one of the flat surfaces, and then meshed together in a bonding operating. However the laminate embodiment is presently preferred.

Even if the relative costs remain fixed, a change in product yields with increased sophistication of the manufacturing process may tip the balance in a new direction. What may be best for low concentrations of 5× to 20× for a concentrator, may not be true for 100× and higher as different considerations come into play such as angular resolution. Similarly, the desired size of the balls favors some manufacturing steps over others. The balls may range in size from 4 microns to 1 mm. For smaller balls, the processes that rely on surface tension are preferable.

Flatness of the mirror is not critical for low concentrations, but for a 100× or higher concentrator, high pointing accuracy of better than + or −0.5 degrees is desirable, and for 1000× an alignment accuracy of + or −0.05 degrees may be necessary. Similarly high alignment accuracy may be needed when using the reflecting balls in analogous applications for an optical switch, for rocket boost, and for light projection such as are taught in the patents and patent applications of Rabinowitz and Davidson e.g. U.S. Pat. No. 6,843,573; U.S. Pat. No. 6,738,176; U.S. Pat. No. 6,698,693; and U.S. Pat. No. 6,612,705.

Aluminum (Al) is relatively inexpensive and makes a good mirror with only ~1000 Å thickness. However for some low melting temperature dielectrics such as carnauba wax, it may preferable to use low melting temperature metals like indium (In), tin (Sn), gallium (Ga), and their alloys. For example a eutectic alloy of gallium-indium-tin with composition by weight of 62.5% gallium, 21.5% indium, and 16.0% tin has a melting point of only 10° C. Thus it is liquid at room temperature, and can form a durable mirror surface by contact coating. It has a vapor pressure of only $10^{-8}$ Torr at 600° C., with a boiling point of 2000° C. These and other such alloys are preferable for low temperature manufacture, but that have the disadvantage of high material cost. For some applications with higher temperature dielectrics, Chrome may be desirable, although it is expensive.

Examples of materials that are appropriate dielectrics for making the balls are: acrylic polymers made from acrylic derivatives such as acrylic acid, methacrylic acid, ethyl acrylate, and methyl acrylate; glass, castor wax, carnuba wax, polyethylene, polyester, etc. Some of the desirable plastics have trade names such as lucite, plexiglass lexan. It is preferable not to use cross-linked polymer in the extrusion/die process of rollers 14 as described in conjunction with FIGS. 13 and 14. When cross-linking is desired, this can be done after the elements 1 are fabricated. Plastic paint can be applied to a metallic film such as Al foil. The smooth flat mirror surface is provided by the metal. Any roughness of the paint can be trimmed away by the roller/die process, annealing, and/or use of a plasticizer. For some purposes, it is desirable to make the dies 22 out of inert material like a ceramic, or the platinum-like metals.

Glass is much cheaper than plastic and is preferable for longevity considerations in an ultraviolet light environment. However, because glass has a higher melting point and higher reactivity in the molten state, manufacturing glass balls with an internal mirror is a formidable challenge. In this case, it is desirable to coat the extrusion die rollers 14 with an inert metal like Platinum or platinum-like metals. Platinum is a very heavy, high melting point metal which as a coating can protect the roller dies from the corrosive effects of glass at elevated temperature. Pure platinum is a soft metal, allowing easy machining. When close to final form, it can be alloyed with small amounts of iridium to greatly increase its hardness. Also preferable as a resistant coating material are the group of six metals known as the "platinum-like metals" which have high melting points and resist chemical reaction. They are especially resistant to oxidation. These are

| Platinum-like Metals | Melting point ° C. |
|---|---|
| Iridium | 2410 |
| Osmium | 3045 + or − 30 |
| Palladium | 1552 |
| Platinum | 1772 |
| Rhodium | 1996 + or − 3 |
| Ruthenium | 2310 |

While the instant invention has been described with reference to presently preferred and other embodiments, the descriptions are illustrative of the invention and are not to be construed as limiting the invention. Thus, various modifications and applications may occur to those skilled in the art without departing from the true spirit and scope of the invention as summarized by the appended claims together with their full range of equivalents.

The invention claimed is:

1. A method for fabricating laminate rotational micro-mirror elements for directed specular reflection of concentrated light, comprising the steps of
   a) advancing a laminate sheet comprised of at least one sheet of reflective material between rollers;
   b) said reflective material functioning as a forward reflecting specular mirror;
   c) heating said laminate sheet while it is kept under tension;
   d) extruding said micro-mirror elements from said laminate sheet by means of a two wheel extrusion die; and
   e) placing said micro-mirror elements in a bath.

2. A method of claim 1 wherein said bath anneals surface and bulk imperfections in said micro-mirror elements.

3. A method of claim 1 wherein solvent is added to said micro-mirror elements to remove surface irregularities.

4. A method of claim 1 wherein the elements are mid-plane micro-mirrored balls.

5. A method of claim 1 wherein the elements are micro-mirror disks.

6. A method of claim 1 wherein said laminate sheet is comprised of at least one sheet of transparent material.

7. A method for manufacturing laminate rotational micro-mirror elements for concentrating solar energy comprising:
   a) depositing a thin reflective coating on a first dielectric sheet;
   b) bonding a second dielectric sheet to said reflective coating to form a laminate sheet;
   c) said first dielectric sheet comprised of a transparent material;
   d) moving said laminate sheet between rollers and heating said laminate sheet while the laminate sheet is under tension;
   e) punching out micro-mirror elements from said laminate sheet with at least a one-wheel extrusion die; and
   f) annealing surface and bulk imperfections in said micro-mirror elements by immersing them in a heated bath.

8. A method of claim 7 further comprising plasticizing said micro-mirror elements to remove surface irregularities.

9. A method of claim 7 wherein at least one sheet of the laminate is glass.

10. A method of claim 7 of wherein said thin reflective coating is vapor deposited.

11. A method of claim 7 further comprising forming elements that are mid-plane micro-mirrored balls.

12. A method of claim 7 wherein the elements are micro-mirror disks.

13. A method of claim 7 wherein said thin reflective coating is a brushed on liquid metal.

14. A method of manufacturing a laminate system of specularly reflecting rotational micro-mirror elements to focus light comprising:
   a) bonding a dielectric sheet to a metallic sheet to form a laminate sheet;
   b) moving said laminate sheet between rollers;
   c) heating said laminate sheet while it is under tension;
   d) punch pressing micro-mirror elements from said laminate sheet by means of an at least one-wheel extrusion die; and
   e) placing said micro-mirror elements in a bath.

15. A method of claim 14 further comprising heating said micro-mirror elements to remove surface irregularities.

16. A method of claim 14 further comprising flexibilizing said micro-mirror elements to remove surface irregularities.

17. A method of claim 14 wherein the elements are mid-plane micro-mirrored balls.

18. A method of claim 14 further comprising forming elements that are micro-mirror disks.

19. A method of claim 14 wherein said dielectric sheet is plastic.

* * * * *